Figure 1A:
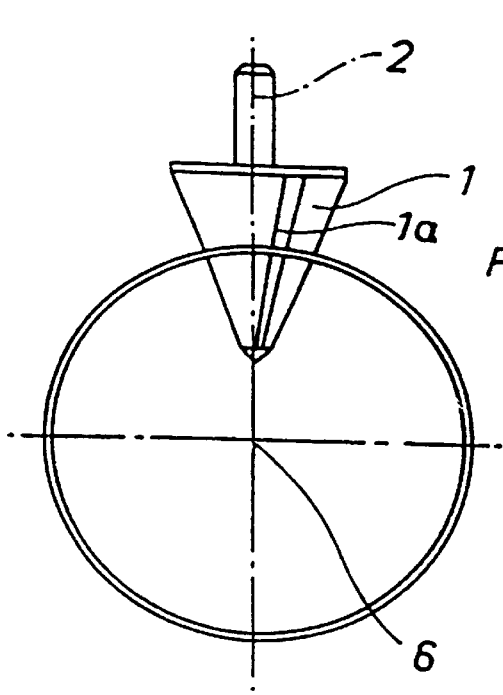

United States Patent [19]

Ikola et al.

[11] Patent Number: 5,876,161
[45] Date of Patent: Mar. 2, 1999

[54] METHOD AND APPARATUS FOR MAKING A LONGITUDINAL HOLE IN A PIPE

[75] Inventors: Juha Ikola, Vaasa; Timo Saari, Laihia, both of Finland

[73] Assignee: T-Drill Oy, Laihia, Finland

[21] Appl. No.: 750,463

[22] PCT Filed: Jun. 7, 1995

[86] PCT No.: PCT/FI95/00325

§ 371 Date: Dec. 9, 1996

§ 102(e) Date: Dec. 9, 1996

[87] PCT Pub. No.: WO95/33591

PCT Pub. Date: Dec. 14, 1995

[30] Foreign Application Priority Data

Jun. 7, 1994 [FI] Finland ................................. 942671

[51] Int. Cl.[6] ................................................. B23C 9/00
[52] U.S. Cl. ........................ 409/132; 408/110; 408/236; 409/178; 409/179; 409/199; 409/201
[58] Field of Search .................................. 408/110, 236; 409/132, 177, 178, 179, 199, 201

[56] References Cited

U.S. PATENT DOCUMENTS

| | | | |
|---|---|---|---|
| 1,886,082 | 11/1932 | Chapman | 408/97 |
| 2,499,842 | 3/1950 | Armitage | 409/201 |
| 2,823,591 | 2/1958 | Craddock et al. | 409/201 |
| 2,969,000 | 1/1961 | Grobecker | 408/95 |
| 3,241,405 | 3/1966 | Davis | 408/110 |
| 3,596,558 | 8/1971 | Rydell . | |
| 3,699,828 | 10/1972 | Piatek et al. | 409/178 |
| 4,425,059 | 1/1984 | Colas et al. | 409/132 |
| 4,729,698 | 3/1988 | Haddon | 408/110 |
| 4,743,149 | 5/1988 | Geise | 409/179 |
| 5,046,903 | 9/1991 | Nagayoshi et al. . | |
| 5,201,618 | 4/1993 | Malarz et al. | 409/199 |
| 5,238,340 | 8/1993 | Ochiai et al. | 409/201 |
| 5,312,211 | 5/1994 | Rodriguez . | |
| 5,368,423 | 11/1994 | Hanna . | |

FOREIGN PATENT DOCUMENTS

| | | | |
|---|---|---|---|
| 820204 | 9/1982 | Finland . | |
| 2113746 | 9/1972 | Germany . | |
| 2645831 | 4/1977 | Germany | 408/95 |
| 2749287 | 5/1979 | Germany | 409/199 |
| 3503300 | 8/1986 | Germany . | |
| 54-42088 | 4/1979 | Japan | 409/132 |
| 595088 | 11/1994 | Russian Federation . | |
| 546438 | 3/1977 | U.S.S.R. | 409/179 |
| 589091 | 1/1978 | U.S.S.R. | 409/132 |
| 1335383 | 9/1987 | U.S.S.R. . | |
| WO 94/17944 | 8/1994 | WIPO . | |

*Primary Examiner*—A. L. Pitts
*Assistant Examiner*—Christopher Kirkman
*Attorney, Agent, or Firm*—Klauber & Jackson

[57] ABSTRACT

An apparatus and method for making an elongated hole in a pipe which includes drilling a rotating conical tool through the pipe wall by pushing the conical tool in the direction of its rotating axis to a desired depth, then simultaneously lifting and tilting the conical bit so as to mill one end of an elongated hole. The rotatable conical tool may be lifted and tilted in the opposite direction to further mill the pipe and elongate the hole. Tilting is effected relative to a pivot point located above the top pipe surface and in a plane extending through a center axis of the pipe, and the angle of inclination can be adjusted for determining the length of the finished hole.

12 Claims, 6 Drawing Sheets

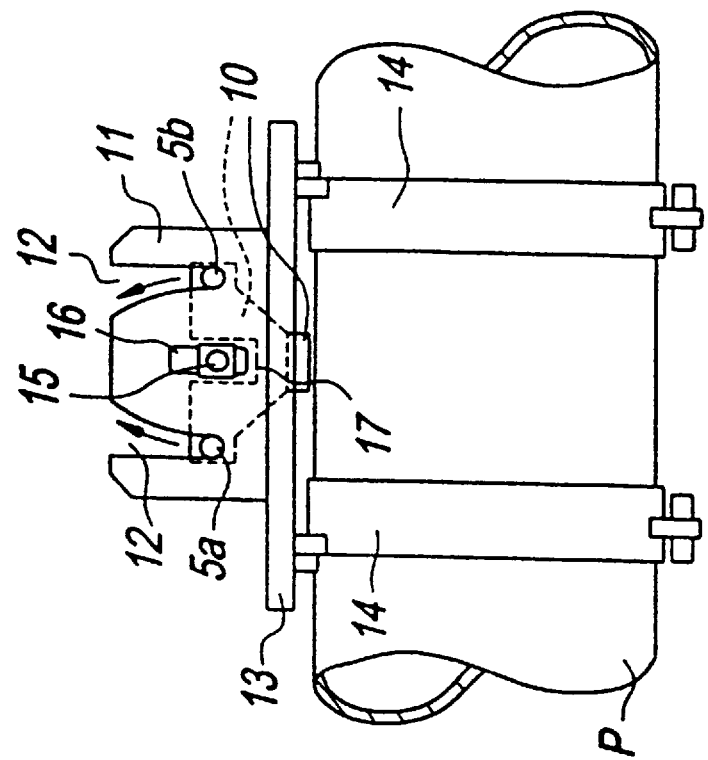
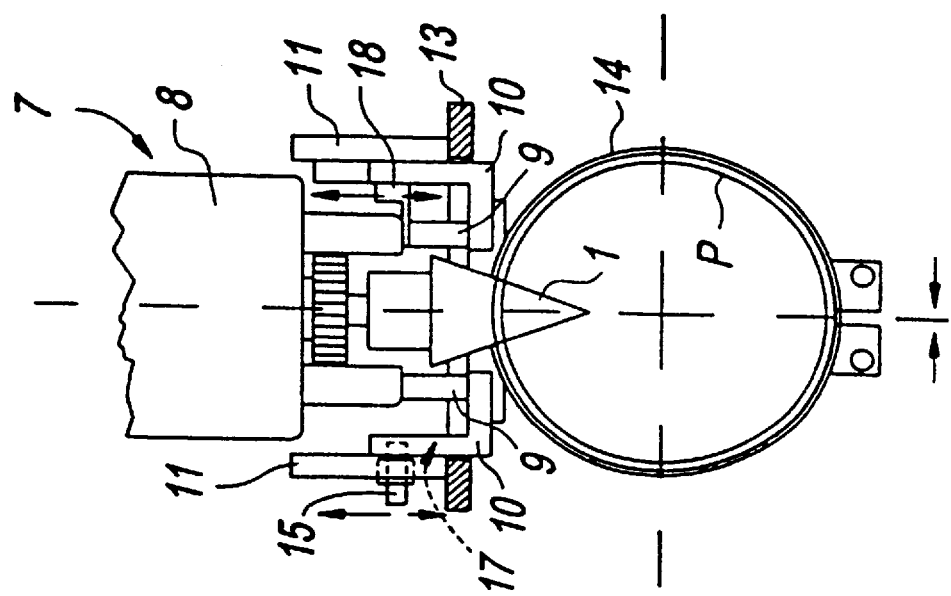

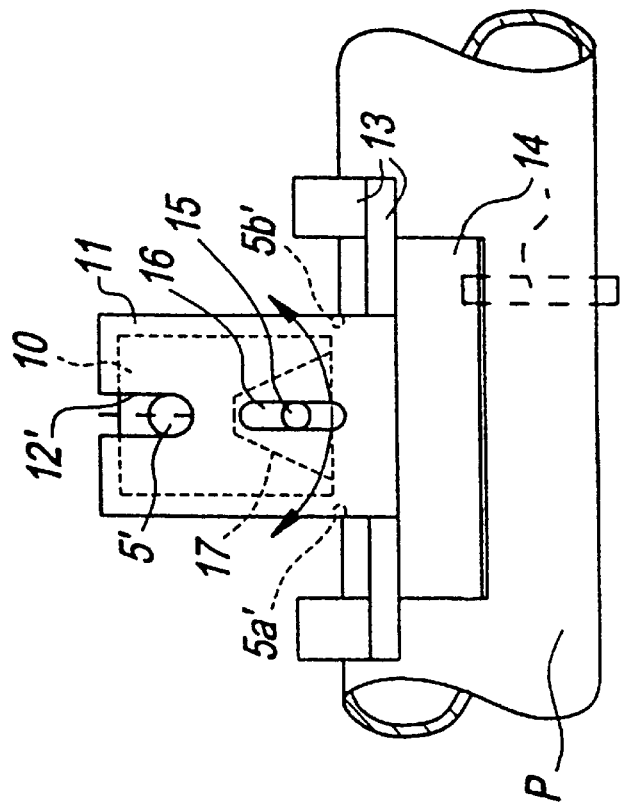
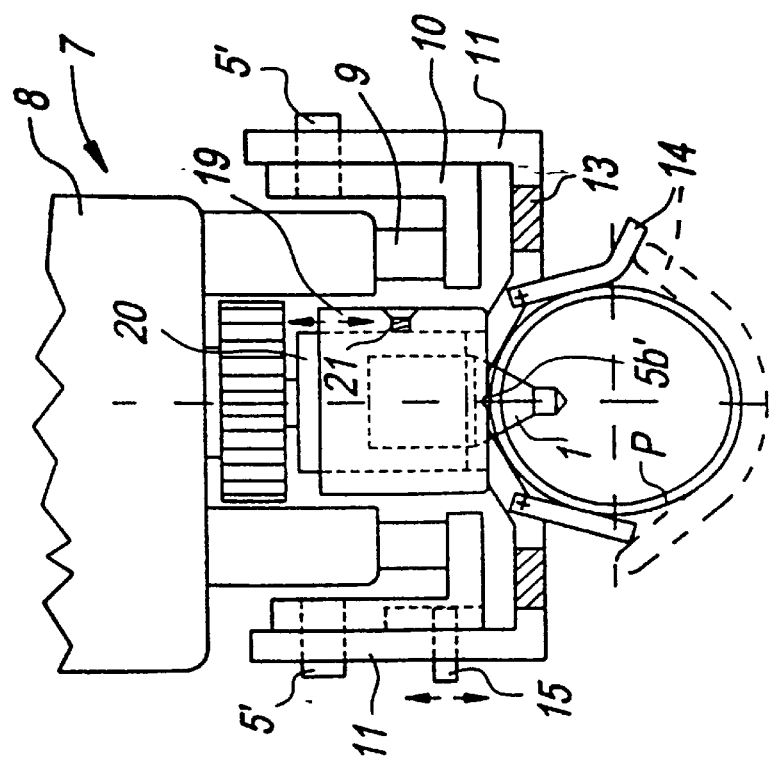
FIG.5B
FIG.5A

METHOD AND APPARATUS FOR MAKING A LONGITUDINAL HOLE IN A PIPE

The present invention relates to a method for making an elongated hole in a pipe by means of a rotating conical tool. One implementation of the method is commenced such that, in a first sequence, a conical tool is used for drilling through the wall of a pipe by pushing the conical tool in the direction of its rotating axis to a desired depth, which determines the width of a finished hole.

When a pipe is provided with a hole in view of pulling up the hole edges as a collar, the edges of said collar can be brought closer to level if the hole is made elongated in the longitudinal direction of the pipe. It is prior known to operate a conical tool such that the hole edges are defined according to an intersecting line between the conical surface and the cylindrical surface, the hole having a degree of ellipticity which depends on the ratio between the diameter of the pipe and the minor diameter of the hole.

An object of the invention is to provide an improved method and apparatus which enable the selection of a ratio between the length and width of a hole more freely than before by means of a simple mechanism. A further benefit offered by the method is the adaptability to various wall thicknesses and pipe materials.

The characterizing features of the method are set forth in the annexed claim 1. The characterizing features of the apparatus are disclosed in claim 6. The non-independent claims disclose characterizing features for preferred embodiments of the invention.

Figure 2A:
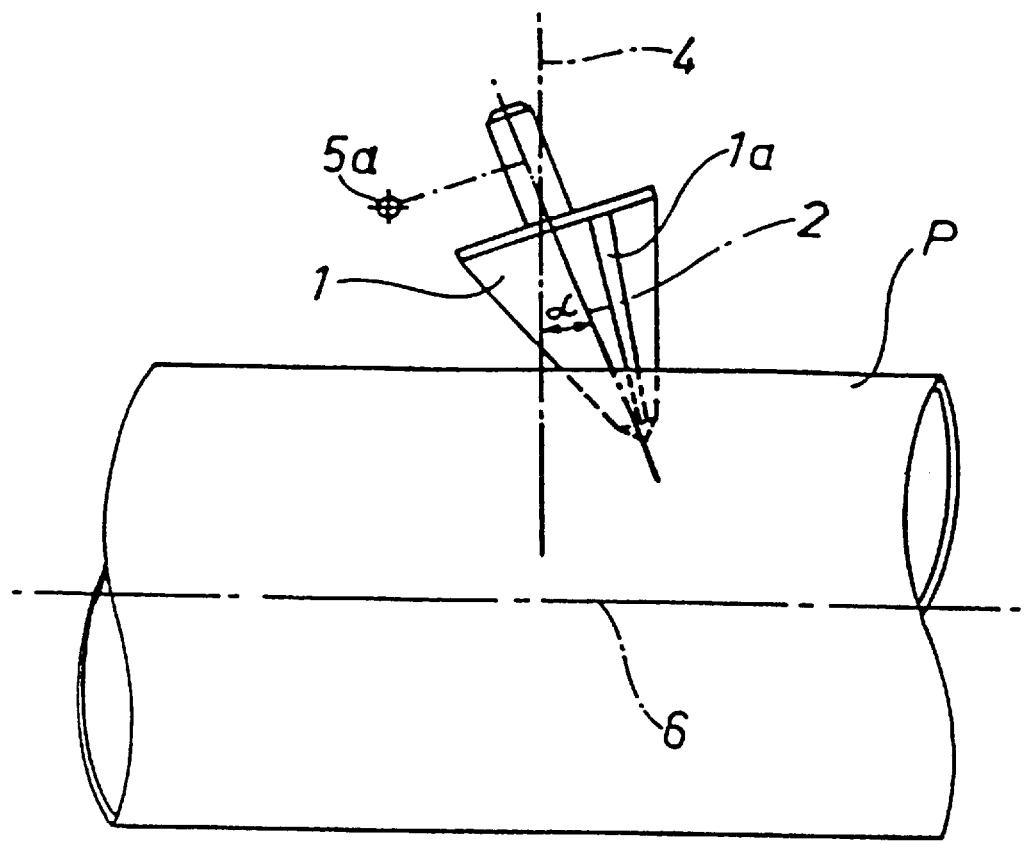
Figure 3A:
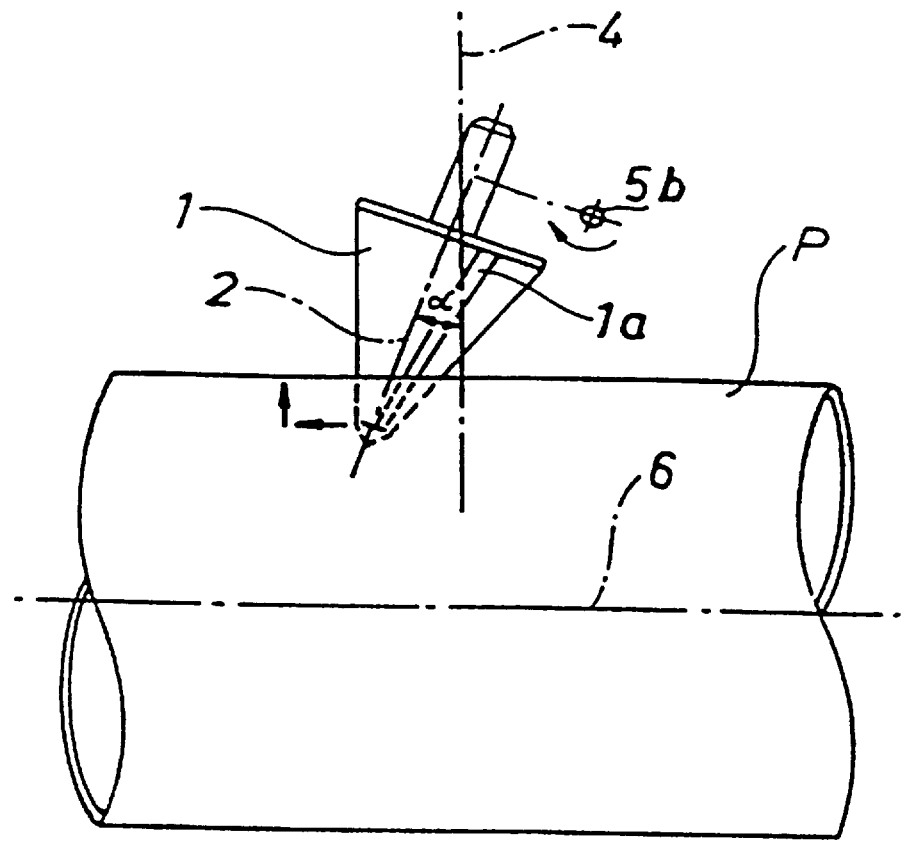
Figure 6:
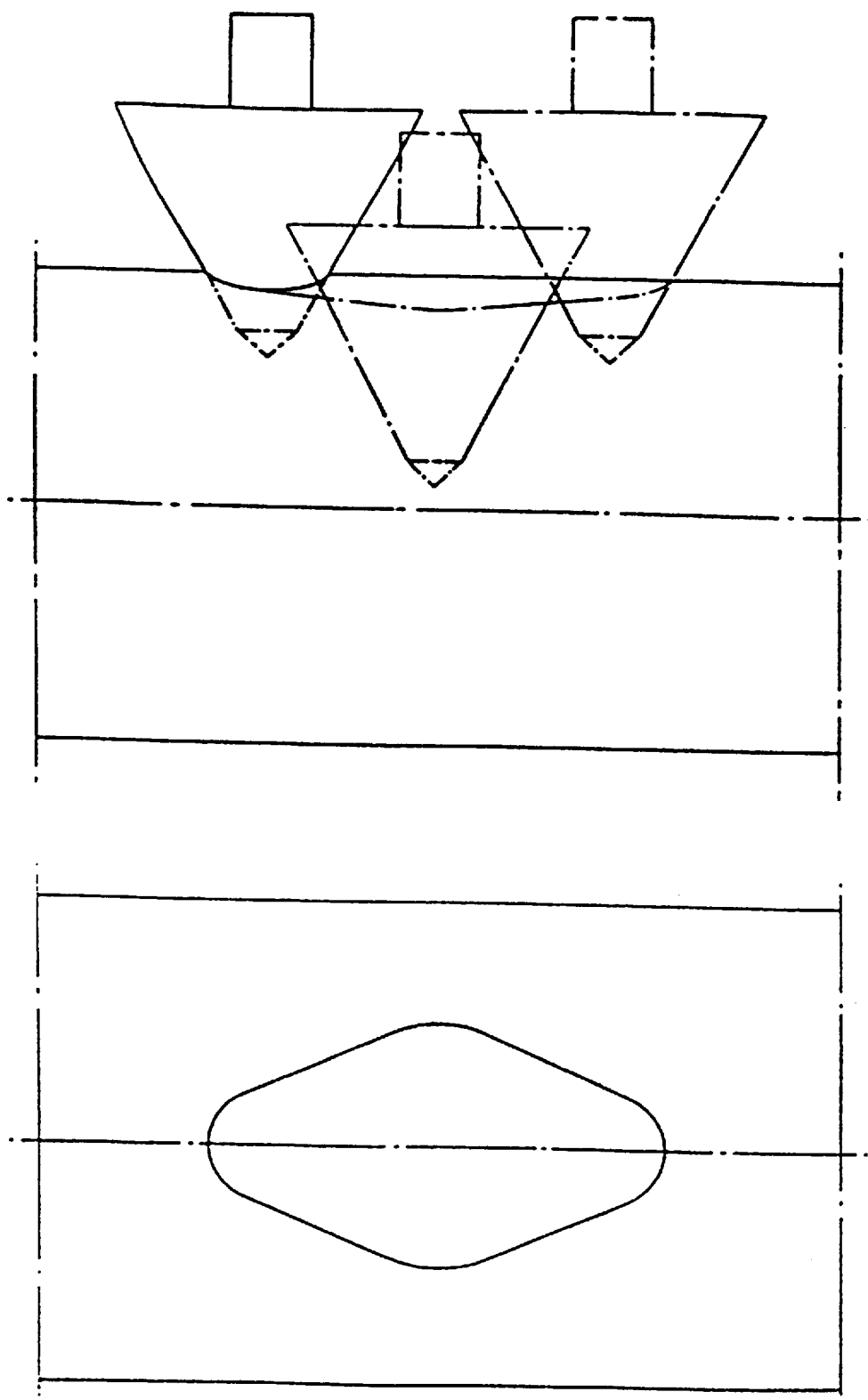

A method and apparatus of the invention will now be described in more detail with reference made to the accompanying drawings, in which FIGS. 1A, B and C depict the implementation of a first sequence of the method from various aspects;

FIGS. 2A and B depict the implementation of a second sequence of the method;

FIGS. 3A and B depict the implementation of a third sequence of the method:

FIGS. 4A and B show an apparatus according to a first embodiment of the invention for controlling the actions of a conical drill;

FIGS. 5A and B show an apparatus according to a second embodiment of the invention for controlling the actions of a conical drill and FIG. 6 illustrates the actions of a conical drill in an alternative method of the invention.

Figure 2B:
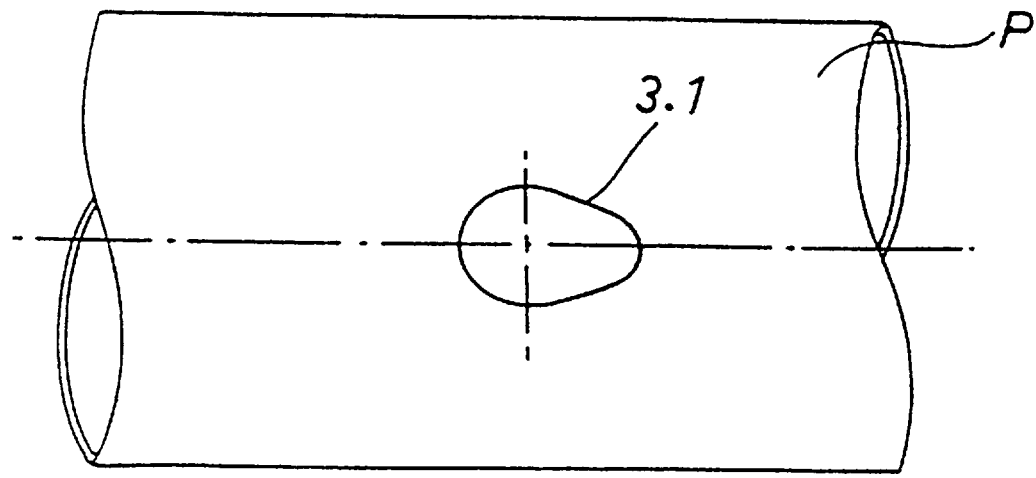
Figure 3B:
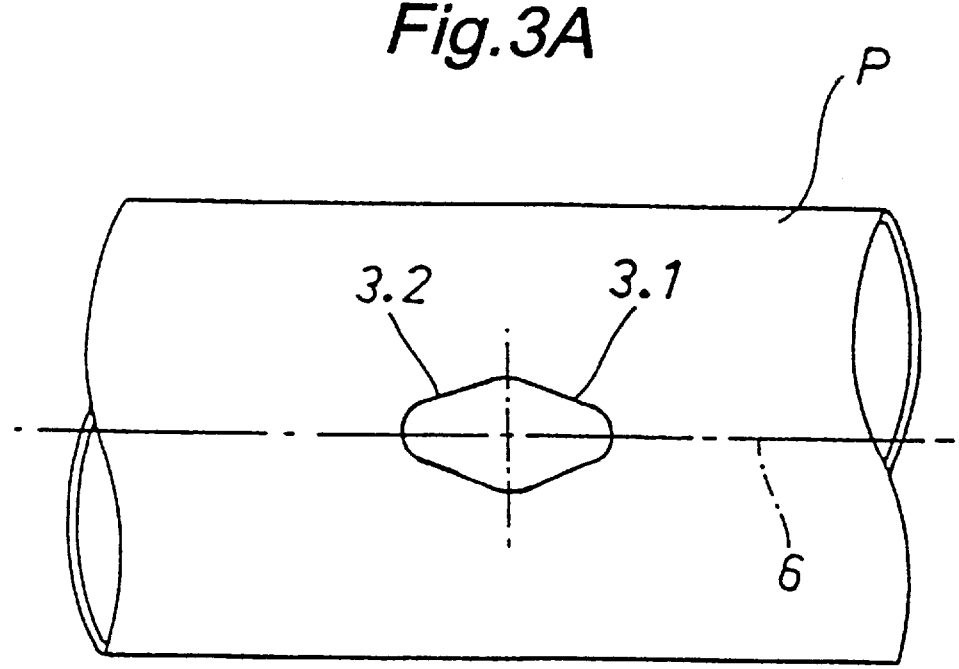

First, a method according to the first embodiment of the invention will be described with reference to FIGS. 1–3.

The method is carried out with a conically shaped tool 1, having a conical surface which is provided with bits 1a on diametrally opposite sides thereof. The conical drill 1 is rotated around a centre axis 2. The rotating axis 2 extends through a pipe centre axis 6.

In the first sequence of the method, the conical drill 1 is used to drill through the wall of a pipe P to a desired depth. This results in a hole 3, having a width which corresponds to that of a finished hole. Thus, the drilling depth determines the width of a hole. In this drilling sequence, the conical bit 1 is pushed in the direction of the rotating axis 2.

In the second sequence, the conical bit 1 is tilted relative to a pivot point 5a located above the top pipe surface. The pivot point 5a is offset from a mid-line 4 in the direction of tilting. Upon tilting, the conical drill 1 rises upward and moves forward in the longitudinal direction of a pipe. Thus, the rotating conical drill 1 mills one end 3.1 of an elliptical hole into the shape shown in FIG. 2. The adjustment of an angle of inclination α of the drill 1 can be used for determining the length of a finished hole in relation to the width thereof.

Figure 1B:
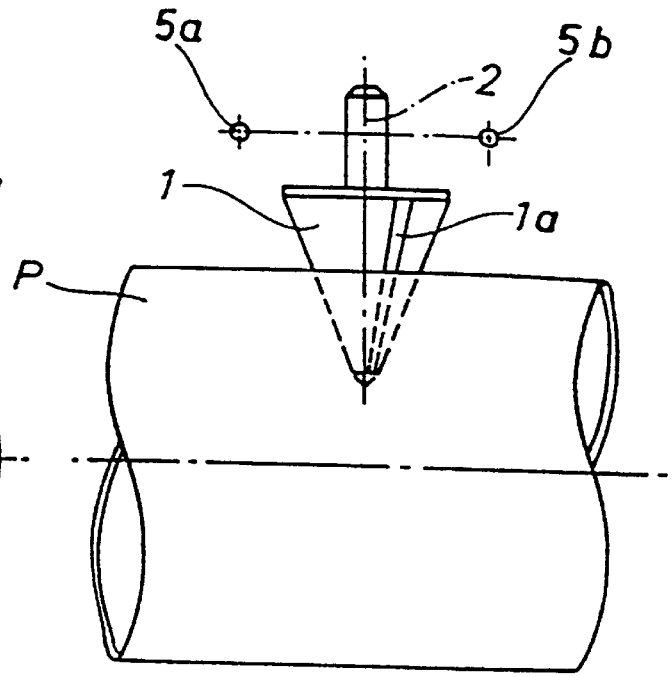
Figure 1C:
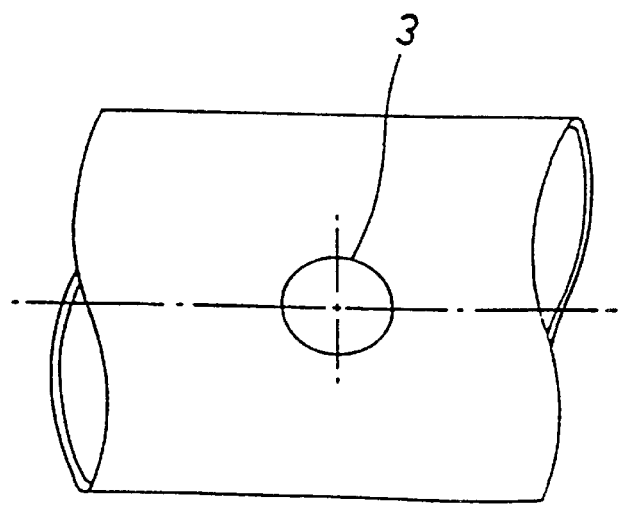

For the third sequence of the method, the conical drill 1 is first returned to an initial position corresponding to FIG. 1, wherein the axis 2 coincides with the mid-line 4. This is followed by effecting a corresponding lift and concurrent tilting about a pivot point 5b in the opposite direction, the conical drill 1 milling the other end 3.2 of the elliptical hole.

The same tool can be used for making holes of varying sizes and degrees of ellipticity since the first-sequence drilling depth and the second- and third-sequence angle of inclination are selectable or adjustable. In this context, the term degree of ellipticity is intended to refer to a hole of any elongated shape, having curved end edges but possibly also linear edge portions.

FIGS. 4A and 4B illustrate an apparatus according to a first embodiment for carrying out the above-described method. The apparatus includes a drive unit 7 provided with a rotating shaft for carrying a conical drill 1. The drive unit 7 includes a housing 8 provided with supporting legs 9 extending therefrom and movable in axial direction relative to the housing 8. The bottom ends of the supporting legs 9 are provided on either side of the drill 1 with brackets 10 which are fitted with journals 5a and 5b received in slots 12 included in brackets 11. The brackets 11 are secured to a base plate 13 which, in turn, is attached to clamping hoops 14 engageable around a pipe P.

Thus, the elements 11, 13 and 14 are secured to the pipe P prior to making a hole. Then the tool 7, having its supporting legs in an extended position, is brought to the drilling site such that the journals 5a and 5b settle in the slots 12. This is followed by carrying out a drilling operation according to the above sequence 1, whereby the supporting legs 9 slide inwards, the housing 8 approaches the pipe P and the conical drill 1 penetrates the pipe. The bracket 10 is fitted with a backstop 18 which determines a drilling depth as a sleeve included in the supporting leg 9 collides with the backstop 18. The vertical position of said backstop 18 is adjustable for adjusting the drilling depth.

This is followed by performing the tilting of the tool 7 and the conical drill 1 included therein about either one of the pivot journals 5a or 5b. A result of this is that the bracket 10 is also inclined relative to the bracket 11. The inclination is limited by means of a pin 15, which is fitted in a slot 16 included in the bracket 11 and which collides with the floor of a slot 17 included in the bracket 10. The height of said limiting pin 15 can be adjusted for adjusting the angle of inclination.

FIGS. 5A and 5B illustrate an apparatus according to a second embodiment, the identical elements being designated with the same reference numerals as in FIGS. 4A and 4B. Also in this case the brackets 11 are secured to a pipe P by means of a base frame 13 and elements 14 engaging around the pipe (the dash-and-dot line refers e.g. to a chain). However, the bracket 11 only includes a single slot 12' receiving a single pivot journal 5' on either side of the drilling axis. On the drilling axis is mounted a fitting element 20 with the chuck end of a conical drill 1 secured therein. The fitting element 20 is surrounded by a bushing 19, adapted to be non-rotatable but axially movable relative to the fitting element 20. The bushing 19 can be clamped e.g. with a screw 21 at a desired axial height relative to the fitting element 20. As the conical drill 1 penetrates the pipe P to a desired depth, the lower end surface of bushing 19 collides with the top surface of pipe P and, thus, determines the drilling depth. Tilting of the drill apparatus 7 results in a pivot point 5a' or 5b', sliding longitudinally of the pipe and located between the end edge of bushing 19 and the top surface of pipe P. During the course of tilting, the supporting legs 9 slide outwards and the pivot journals 5' can be locked to the floor of said slot 12'. Alternatively, the pivot journals 5' may rise within the slot 12'. The inclination limiting pin 15 collides with a slanting wall 17 included in the slot of said bracket 10.

The pin 15 can be secured at various heights within the slot 16 for adjusting the angle of inclination.

In the above cases, the mid-section of a hole is drilled first. As shown in FIG. 6, it is also possible to proceed in reverse order, whereby the drilling is commenced at the end of a hole, progress is made towards the middle of a hole while increasing the drilling depth and, following the mid-section of a hole, the drilling depth is reduced and the drill is lifted up at the other end of a hole. In the case of FIG. 6, this alternative method is shown to be implemented by maintaining the drilling axis in vertical direction at all times. In view of engineering, this can be accomplished by means of the computer control or jig control of actions effected in the direction of X- and Y-coordinates. Also in such versions of the apparatus, which involve tilting of the drilling axis, it is possible to employ various combinations of pivoted axles and jig controls. The locations of pivoted axles shown in connection with FIGS. 4 and 5 result in a preferred mechanical construction but, naturally, an equivalent action can be accomplished with highly diversified dispositions of pivoted axles. An essential feature in the invention is that, during the course of drilling effected by means of a conical drill, the drill is maneuvered simultaneously both in the longitudinal direction and transverse direction of a pipe away from or towards the centre axis.

We claim:

1. A method for making an elongated hole in a pipe by means of a rotating conical tool whereby, in a first sequence, the rotating conical tool is used for drilling through the pipe wall by pushing the conical tool in the direction of its rotating axis to a desired depth, which determines the width of a finished hole, characterized in that, in a second sequence, the conical bit is lifted from said depth and simultaneously tilted whereby, upon rotating, said conical tool mills one end of an elongated hole and a third sequence involves the identical lift of said conical tool and tilting thereof in the opposite direction, said rotating conical bit milling another end of said elongated hole, whereby the tilting is effected relative to a pivot point located above the top pipe surface and in a plane extending through a centre axis of said pipe, an angle of inclination being adjusted for determining the length of a finished hole.

2. The method according to claim 1 wherein the tilting of the conical tool is effected relative to a pivot point located above the top surface of the pipe and offset from the drilling axis.

3. An apparatus for making an elongated hole in a pipe, said apparatus comprising:

a rotatable conical tool for drilling and milling into the pipe, said tool having an axis of rotation, wherein the axis of rotation of said tool is tiltable in a plane passing through the axis of the pipe;

drive means for rotating the conical tool;

a housing for the drive means;

supporting legs slidably mounted to said housing, said supporting legs being slidable in an axial direction parallel to the axis of rotation of said conical tool, whereby said conical tool is capable of advancing and retreating in alignment with said supporting legs; and support and alignment means for supporting and aligning said supporting legs relative to the pipe, said support and alignment means including:

first bracket means for securement to the pipe;

second bracket means attached to the distal ends of said supporting legs;

at least one pivot means for pivotally connecting said first and second bracket means, said pivot means being disposed transverse to the axial direction of the pipe, thereby allowing said second bracket means to pivot with respect to said first bracket means; and inclination limiting means for limiting the pivoting of said second bracket means with respect to said first bracket means, thereby limiting the tilt of said tool with respect to the pipe;

wherein said conical tool is capable of being simultaneously tilted and moved along its axis of rotation;

whereby said tool is capable of forming an elongated hole in the pipe.

4. The apparatus according to claim 3 wherein said inclination limiting means is adapted to allow selective adjustment of the angle of inclination of said tool.

5. The apparatus according to claim 4 further comprising means for limiting the drilling depth of said conical tool.

6. The apparatus according to claim 4 wherein said at least one pivot means comprises at least one pivoted axle.

7. The apparatus according to claim 4 wherein said at least one pivot means comprises at least one pivoting fulcrum.

8. The apparatus according to claim 6 or 7, wherein the axis of rotation defines a drilling axis when said tool is normal to the outer surface of the pipe, and wherein said at least one pivot means is offset from the drilling axis.

9. The apparatus according to claim 8 wherein said pivot means is located flush with or above the top surface of the pipe.

10. A method for making an elongated hole in a pipe by means of a rotating conical bit having an axis of rotation, said method comprising the following steps:

first, drilling the conical bit in the direction of its axis of rotation along a drilling axis which is normal to the outer surface of the pipe to a desired depth into the pipe wall, thereby determining the maximum width of the hole; and second, simultaneously lifting and tilting the rotating conical bit longitudinally into the pipe wall, thereby milling the pipe and elongating the hole.

11. The method according to claim 10 further comprising the following steps:

third, returning the conical bit to its normal position at the desired depth; and fourth, simultaneously lifting and tilting the rotating conical bit longitudinally into the pipe wall in an opposite direction, thereby milling the pipe and further elongating the hole.

12. The method according to claim 10 wherein the tilting of the conical bit is effected relative to a pivot point located above the top surface of the pipe and offset from the drilling axis.

* * * * *